(12) United States Patent
Tomita

(10) Patent No.: US 7,860,366 B2
(45) Date of Patent: Dec. 28, 2010

(54) INFORMATION PROCESSING DEVICE AND METHOD, RECORDING MEDIUM, AND PROGRAM

(75) Inventor: Nobuyoshi Tomita, Saitama (JP)

(73) Assignee: Sony Corporation, Tokyo (JP)

( * ) Notice: Subject to any disclaimer, the term of this patent is extended or adjusted under 35 U.S.C. 154(b) by 1206 days.

(21) Appl. No.: 10/514,972

(22) PCT Filed: Apr. 22, 2003

(86) PCT No.: PCT/JP03/05082

§ 371 (c)(1),
(2), (4) Date: Nov. 18, 2004

(87) PCT Pub. No.: WO03/098930

PCT Pub. Date: Nov. 27, 2003

(65) Prior Publication Data

US 2005/0226252 A1   Oct. 13, 2005

(30) Foreign Application Priority Data

May 21, 2002  (JP)  ............ P2002-145652

(51) Int. Cl.
*H04N 5/91* (2006.01)
(52) U.S. Cl. .................................. 386/46; 386/96
(58) Field of Classification Search .............. None
See application file for complete search history.

(56) References Cited

U.S. PATENT DOCUMENTS 6,222,841 B1 * 4/2001 Taniguchi ............. 370/389

FOREIGN PATENT DOCUMENTS

EP  0 853 407 A2  7/1998
EP  0 905 976  3/1999

(Continued)

OTHER PUBLICATIONS

Wittig H et al., "Network Layer Scaling: Congestion Control in Multimedia Communication with Heterogenous Networks and Receivers", Multimedia Transport and Teleservices. International Cost 237 Workshop Proceedings Vienna, Nov. 13-15, 1994, pp. 274-293, XP000585306.

(Continued)

*Primary Examiner*—Thai Tran
*Assistant Examiner*—Heather R Jones
(74) *Attorney, Agent, or Firm*—Finnegan Henderson Farabow Garrett & Dunner LLP

(57) ABSTRACT

The present invention relates to an information processing apparatus and method, recording medium, and program capable of generating a priority table in a straightforward manner. JPEG 2000 data 151 inputted to a table generation section 114 is held by a JPEG 2000 data reading section 161, and is provided to a JP2 packet information extraction section 162 at a prescribed timing. After the necessary JP2 packet information has been extracted in packet form, this is provided to a priority table editing section 164. Then, at the priority table editing section 164, a priority table with priority values set for all of the JP2 packets is made based on setting information 152 designating priority values for some of the JP2 packets corresponding to the JPEG 2000 data 151 provided by the setting information reading section 163 and is outputted by the priority table output section 165. The present invention can be applied to personal computers.

8 Claims, 19 Drawing Sheets

FOREIGN PATENT DOCUMENTS

| | | |
|---|---|---|
| EP | 1 023 799 | 7/2002 |
| GB | 2 322 509 | 8/1998 |
| JP | 07-273789 | 10/1995 |
| JP | 10-200494 | 7/1998 |
| JP | 11-225168 | 8/1999 |
| JP | 2000-078573 | 3/2000 |
| JP | 2001-186173 | 7/2001 |
| JP | 2001-521332 | 11/2001 |
| JP | 2002-112265 | 4/2002 |
| JP | 2002-141945 | 5/2002 |
| WO | WO 98/42132 | 9/1998 |
| WO | WO 99/21338 | 4/1999 |

OTHER PUBLICATIONS

Deshpande S. et al., "Scalable Streaming of JPEG2000 Images Using Hypertext Transfer Protocol", Proceedings of the $9^{th}$. ACM International Conference on Multimedia. Ottawa, Canada, Sep. 30-Oct. 5, 2001, vol. Conf. 9, Sep. 30, 2001, pp. 372-381, XP002286797.

Li J. et al.,"A virtual Media (Vmedia) Access Protocol and Its Application in Interactive Image Browsing", Multimedia Computing and Networking Proceedings of the SPIE, vol. 4312, No. 10, Jan. 2001, pp. 1-13, XP002243461.

Communication pursuant to Article 94(3) EPC, mailed by European Patent Office on Feb. 18, 2009, in European Application No. 03 717 685.06-1247.

* cited by examiner

FIG. 3

| L | R | C | P | PRIORITY |
|---|---|---|---|---|
| 0 | 0 | — | — | 1 |
| 0 | ONE OR MORE | — | — | 2 |
| 1 | — | — | — | 3 |
| ⋮ | ⋮ | ⋮ | ⋮ | ⋮ |

| L | R | C | P | PRIORITY |
|---|---|---|---|---|
| 0 | 0 | — | — | 1 |
| ONE OR MORE | 0 | — | — | 2 |
| — | 1 | — | — | 3 |
| ⋮ | ⋮ | ⋮ | ⋮ | ⋮ |

| L | R | C | P | PRIORITY |
|---|---|---|---|---|
| 0 | 0 | 0 | 0 | 1 |
| 0 | 0 | 0 | 1 | 2 |
| 0 | 0 | 0 | 2 | 3 |
| 0 | 0 | 0 | 3 | 4 |
| 0 | 0 | 1 | 0 | 5 |
| 0 | 0 | 1 | 1 | 6 |
| 0 | 0 | 1 | 2 | 7 |
| 0 | 0 | 1 | 3 | 8 |
| 0 | 1 | 0 | 0 | 9 |
| 0 | 1 | 0 | 1 | 10 |
| 0 | 1 | 0 | 2 | 11 |
| 0 | 1 | 0 | 3 | 12 |
| 0 | 1 | 1 | 0 | 13 |
| 0 | 1 | 1 | 1 | 14 |
| 0 | 1 | 1 | 2 | 15 |
| 0 | 1 | 1 | 3 | 16 |
| 0 | 2 | 0 | 0 | 17 |
| 0 | 2 | 0 | 1 | 18 |
| 0 | 2 | 0 | 2 | 19 |
| 0 | 2 | 0 | 3 | 20 |
| 0 | 2 | 1 | 0 | 21 |
| 0 | 2 | 1 | 1 | 22 |
| 0 | 2 | 1 | 2 | 23 |
| 0 | 2 | 1 | 3 | 24 |
| 1 | 0 | 0 | 0 | 25 |
| 1 | 0 | 0 | 1 | 26 |
| 1 | 0 | 0 | 2 | 27 |
| 1 | 0 | 0 | 3 | 28 |
| 1 | 0 | 1 | 0 | 29 |
| : | : | : | : | : |

| L | R | PRIORITY VALUE | |
|---|---|---|---|
| 0 | 0 | 10 | |
| 0 | ONE OR MORE | 20 | |
| 1 | 0 OR MORE | 30 | ~351 |

FIG. 17

| MH | TH_0 | JP2_0 | JP2_1 | JP2_2 | JP2_3 | JP2_4 | JP2_5 | TH_1 | JP2_0 | JP2_1 | JP2_2 | JP2_3 | JP2_4 | JP2_5 |
|---|---|---|---|---|---|---|---|---|---|---|---|---|---|---|
| LEVEL OF IMPORTANCE | | HIGH | MEDIUM | MEDIUM | LOW | LOW | LOW | | HIGH | MEDIUM | MEDIUM | LOW | LOW | LOW |
| PATTERN | | | | | | | | | | | | | | |
| 1-1 | | 10 | 20 | 20 | 20 | 30 | 30 | | 10 | 20 | 20 | 20 | 30 | 30 |
| 1-2 | | 10 | 20 | 21 | 22 | 30 | 31 | | 10 | 20 | 21 | 22 | 30 | 31 |
| 1-3 | | 10 | 20 | 20 | 20 | 20 | 20 | | 10 | 20 | 20 | 20 | 20 | 20 |
| 1-4 | | 10 | 20 | 21 | 22 | 23 | 24 | | 10 | 20 | 21 | 22 | 23 | 24 |
| 1-5 | | 10 | 20 | 20 | 21 | 21 | 21 | | 10 | 20 | 20 | 21 | 21 | 21 |
| 2-1 | | 10 | 10 | 10 | 10 | 10 | 10 | | 10 | 10 | 10 | 10 | 10 | 10 |
| 2-2 | | 11 | 11 | 12 | 13 | 14 | 15 | | 10 | 11 | 12 | 13 | 14 | 15 |
| 2-3 | | 11 | 11 | 11 | 12 | 12 | 12 | | 10 | 11 | 11 | 12 | 12 | 12 |
| 3-1 | | 1 | 1 | 1 | 1 | 1 | 1 | | 1 | 1 | 1 | 1 | 1 | 1 |
| 3-2 | | 2 | 2 | 3 | 4 | 5 | 6 | | 1 | 2 | 3 | 4 | 5 | 6 |
| 3-3 | | 2 | 2 | 2 | 3 | 3 | 3 | | 1 | 2 | 2 | 3 | 3 | 3 |

FIG. 18

| | L | R | C | P | PRIORITY VALUE |
|---|---|---|---|---|---|
| JP2_0 | 0 | 0 | — | — | 10 |
| JP2_1 | 0 | 1 | — | — | 20 |
| JP2_2 | 0 | 2 | — | — | 20 |
| JP2_3 | 1 | 0 | — | — | 20 |
| JP2_4 | 1 | 1 | — | — | 30 |
| JP2_5 | 1 | 2 | — | — | 30 |

| | L | R | C | P | PRIORITY VALUE |
|---|---|---|---|---|---|
| JP2_0 | 0 | 0 | — | — | 10 |
| JP2_1 | 0 | 1 | — | — | 20 |
| JP2_2 | 0 | 2 | — | — | 21 |
| JP2_3 | 1 | 0 | — | — | 22 |
| JP2_4 | 1 | 1 | — | — | 30 |
| JP2_5 | 1 | 2 | — | — | 31 |

|  | L | R | C | P | PRIORITY VALUE |
|---|---|---|---|---|---|
| JP2_0 | 0 | 0 | — | — | 10 |
| JP2_1 | 0 | 1 | — | — | 20 |
| JP2_2 | 0 | 2 | — | — | 20 |
| JP2_3 | 1 | 0 | — | — | 21 |
| JP2_4 | 1 | 1 | — | — | 30 |
| JP2_5 | 1 | 2 | — | — | 30 |

363

INFORMATION PROCESSING DEVICE AND METHOD, RECORDING MEDIUM, AND PROGRAM

TECHNICAL FIELD

The present invention relates to an information processing apparatus and method, recording medium, and program, and particularly relates to an information processing apparatus and method, recording medium and program capable of generating priority tables in an easier manner by also setting priority values for packets that are not set with priority values.

BACKGROUND ART

In recent years, services of distributing streaming data that enables its display in real-time while acquiring data such as moving images etc. via the Internet have proliferated.

Data quality deterioration due to packet loss and delays in arrival is a problem when carrying out such a streaming distribution over the Internet. So-called error propagation occurs where the picture quality of subsequent frames is influenced if data for a certain frame is dropped due to packet loss in the case of encoding methods such as MPEG (Moving Picture Experts Group) and H.26x systems, in which differences between frames are taken. Further, the compression rate can be increased in the MPEG method using movement prediction but algorithms become complex if movement prediction is carried out and as this processing time becomes larger in proportion to the square of frame size, theoretically, a coding delay for an amount of several frames occurs. The delay time in this case is such that the time delay is on the borderline of 250 ms that is the permitted delay time when carrying out two-way communication in real-time.

On the other hand, Motion JPEG 2000 is for handling moving images by continuously reproducing the still image compression algorithm JPEG 2000 and is the successor to JPEG (Joint Photographic Expert Group). This file format is defined in part 3 of the JPEG 2000 standard standardized by the ISO (International Organization for Standardization). Motion JPEG 2000 is a moving image format that does not capture frame differences and would not experience the problems described above. Further, JPEG 2000 that is the foundation for Motion JPEG 2000 increases compression rate by using wavelength conversion and entropy encoding. As this is a moving image format that does not capture frame differences, compression and picture quality is higher than with the same Motion JPEG and DV codecs (Digital Video codec). Moreover, tolerance of various errors can be achieved with JPEG 2000 and it is considered that a moving image format such as Motion JPEG 2000 that does not take differences is appropriate for environments where packet loss occurs such as on the Internet.

In the event of carrying out streaming distribution of moving image data compressed using JPEG 2000, moving image data is distributed in packet form using RTP (Real-time Transport Protocol). "RTP Payload Format for JPEG 2000 Video streams" has been proposed as an Internet draft as an RTP format for streaming distribution employing JPEG 2000. An example of this RTP format is described with reference to FIG. 1 and FIG. 2. The RTP format shown in FIG. 1 and FIG. 2 is based on that disclosed in "draft-ietf-avt-rtp-jpg2000-00.txt".

In FIG. 1, an RTP packet 10 is comprised of an IP header 11 containing header information for IP (Internet Protocol) use, a UDP header 12 containing header information for UDP (User Datagram Protocol) use, an RTP header 13 containing header information for usual RTP use, an RTP payload header 14 containing header information for streaming distribution of JPEG 2000 data, and JPEG 2000 data 15 distributed by streaming.

At the RTP packet 10, the IP header 11 is 20 bytes, the UDP header 12 is 8 bytes, the RTP header 13 is 12 bytes, the RTP payload header 14 is 8 bytes, and the JPEG 2000 data is in the order of 10 to 1400 bytes.

FIG. 2 is a view showing the details of the RTP header 13 and the RTP payload header 14 shown in FIG. 1.

In FIG. 2, the RTP header 13 is comprised of version bits (V) 21 of two bits, a padding bit (P) 22 of one bit, an extension bit (X) 23 of one bit, a contributing sources identifier (Contributing Sources) count bit (CC(CSRCcount)) 24 of four bits, a marker (M) 25 of one bit, a payload type (Payload type) 26 of seven bits, a sequence number (Sequence number 27) of 16 bits, an RTP time stamp (RTP timestamp) 28 of 32 bits, and a synchronization sources identifier (SSRC(Synchronization Sources)) 29 of 32 bits.

The RTP payload header 14 continuing on from the RTP header 13 is comprised of an enable bit (E) 31 of one bit, an extension bit (X) 32 of one bit, a main header (M) 33 of one bit, a tile header (T) 34 of one bit, a termination flag (L) 35 of one bit, a main header ID ($Mh_{13}$ id) 36 of 3 bits, a priority (Priority) 37 of 8 bits, a tile header ID (tile_id) 38 of 16 bits, and an offset value (Fragment offset) 39 of 32 bits.

The version bits (V) 21 of the RTP packet 13 are bits showing the version of the RTP. The padding bit (P) 22 shows the presence of padding at the end of the data if this value is "1" and the extension bit 23 indicates the presence of an extension header if this value is "1".

Further, the contributing sources identifier count bit (CC) 24 shows the number of contributing source identifiers (CSRC) contained in the RTP header 13. The marker (M) 25 is dependent on the payload type and has various uses, and the payload type (Payload type 26) expresses the type of the transmitted stream. Moreover, the sequence number (Sequence number) 27 is constructed from a number showing the packet order.

Further, the RTP time stamp (RTP timestamp) 28 indicates a clock value for this data, and the synchronization sources identifier (SSRC) 29 is a synchronization source identifier (Synchronization Sources) constituting an ID (IDentification) for uniquely identifying the sender.

The enable bit (E) 31 of the RTP payload header 14 is a JPEG 2000 payload header validation bit, and if the value of this enable bit (E) 31 is "0", it is shown that each of the fields of the main header (M) 33, tile header (T) 34, termination flag (L) 35, main header ID (Mh_id) 36, priority (Priority) 37, and tile header ID (tile_id) 38 are not used, and these field values are all set to "0". Further, conversely, if the value of the enable bit (E) 31 is "1", this shows that the values of the aforementioned fields are all effective. The fields of the extension bit (X) 32 and the offset value (Fragment offset) 39 are always valid regardless of the value of the enable bit (E) 31.

The extension bit (X) indicates the continuation of the extension header if this value is "1".

Further, the main header (M) 33 indicates the presence of a main header in a packet, the tile header (T) 34 indicates the presence of a tile header in a packet, and the termination flag (L) 35 indicates the presence of the very end of a main header or tile header in a packet.

In the event that the combination of values for the main header (M) 33, tile header (T) 34 and termination flag 35 is, in order, "101", the data 15 of the JPEG 2000 of FIG. 1 is configured from only the main header or is configured only from the final portion within the main header which is divided into a plurality of parts. In the event that the combination of values for the main header (M) 33, tile header (T) 34 and termination flag (L) 35 is, in order, "011", the JPEG 2000 data 15 of FIG. 1 is configured from a title header and JPEG 2000 packet (hereinafter referred to as a JP2 packet), or only a final portion within a tile header that has been divided into a plurality.

Further, in the event that the combination of values for the main header (M) 33, tile header (T) 34 and termination flag (L) 35 is, in order, "100", the JPEG 2000 data of FIG. 1 is configured from the first portion within a main header divided into a plurality or only a middle portion. In the event that the combination of values for the main header (M) 33, tile header (T) 34 and termination flag (L) 35 is, in order, "010", the JPEG 2000 data 15 of FIG. 1 is configured from a first portion within the tile headers divided into a plurality or a middle portion only.

Moreover, in the event that the combination of values for the main header (M) 33, tile header (T) 34 and termination flag (L) 35 is, in order, "111", the JPEG data 15 of FIG. 1 is configured from a main header and a tile header, or is configured from a main header, tile header and JP2 packet.

Namely, through combinations of these values as shown above, the main header (M) 33, tile header (T) 34 and termination flag (L) 35 indicate what kind of header section is configured at a packet.

An ID of the main domain is shown at the main header ID (Mh_id) 36 of FIG. 2, and contains values ("1" to "7") that are incremented every time the main header changes. The value "0" is set if this is not-yet used.

Priority (Priority) 37 expresses the level of importance (1 to 254) of the JP2 packet within the RTP packet.

The tile header ID (tile_id) 38 is set with a tile header within the payload and the title ID (0x0000 to 0xffff) to which the JP2 packet belongs. In the event that only a main header exists, the value "0" can be set to the tile header ID 38.

The offset value (Fragment offset) 39 indicates an offset value within the JPEG2000 frame data, i.e. an octet number from the header of the frame.

When the priority value set at the priority (Priority) 37 of the RTP payload header 14 shown in FIG. 2 is "1", the priority is the highest, with the priority falling every time the value is increased, so that the priority in the case of "254" gives the lowest priority.

In, for example, the event that a user views only part of an entire image of an image with a broad range such as an omni-directional image, the priority value is a value referenced while decoding only image data corresponding to a requested portion (containing a portion for this range as requested) rather than image data corresponding to the whole image. Further, it is there possible to carry out partial distribution by distributing only data corresponding to part of the image by having the distribution server carrying out the streaming distribution refer to this priority value.

Moreover, for example, in the event of terminals connected to networks of narrow bandwidths or carrying out streaming distribution with respect to terminals of low playback performance, only the first JPEG 2000 data within a single image frame encoded using layer encoding is decoded. This means that it is possible to output images of low resolution and images of coarse picture quality and overflow can therefore be prevented.

The distribution server refers to the priority value every JP2 packet, and is capable of carrying out scaleable distribution the distributes only part of the data.

Further, this priority value can be set based on a priority mapping table prepared each session. When the JPEG 2000 data (JP2 packet) in the packet is a header section, the priority value is set with the value "0" for the highest priority, and in the event of a data section, values from "1" to "254" can be set. In the event that a priority mapping table does not exist, a value "255" indicating that this field does not yet exist can be set.

FIG. 3 is a view showing an example of a priority table.

In FIG. 3, a priority table 41 is a correspondence table for a layer (L (layer)), resolution (R(resolution)), component (C (component)) and precinct (P (precinct)), and priority value (Priority). The priority table 41 is a table for the case where the priority value is set taking a layer as a reference.

FIG. 4 is a view showing a further example of a priority table.

The priority table 51 shown in FIG. 4 is a table for the case where the priority value is set taking resolution as a reference.

However, in the event that, for example, a single JPEG 2000 frame is configured from a large number of JP2 packets and the priority values are set to be fine, it is necessary to set priority for all of the JP2 packets. Because of this, it is necessary to be aware of the number of JP2 packets and it is necessary to set priority values just for this number of packets, which requires a complex operation.

FIG. 5 is a view showing an example of a priority table occurring in this case.

In the event that the priority value is set to fine, as with the priority table 61 shown in FIG. 5, the amount of data for the priority table prepared in advance is substantial, and the amount of work involved in generating this table increases.

DISCLOSURE OF INVENTION

The present invention made in view of this kind of situation, and makes it possible to generate a priority table in easier manner.

An information processing apparatus of the present invention is characterized by including: setting information acquisition means for acquiring setting information for which priority values corresponding to some of packets within image data put into packet form are designated; packet information read-out means for reading out packet information containing information relating to putting image data into the form of packets from the image data; and priority table generation means for generating a priority table with priority values set for all packets based on setting information acquired by the setting information acquisition means and packet information read out by the packet information reading means.

The packet information may be made to contain the numbers of packets and the levels of importance corresponding to the image data.

A setting rule deciding means for deciding rules for setting priority values for all of the packets may be further provided. The priority table generation means may use the rules decided by the setting rules deciding means to set priority values for all of the packets and make the priority table.

The priority table generation means may set a priority value larger than a value set for one previous packet if a priority value is set for packets other than packets set with priority values using the setting information.

In the event that priority values are set for packets other than packets set with priority values using the setting information, the priority table generation means may set a priority value larger than the value set for one packet previous if the packet's level of importance is different to the packet's level of importance for one packet previous, and a priority value that is the same value as the value set for one packet previous may be set if the packet's level of importance is the same as the packet's level of importance for one packet previous.

The priority table generation means may set a priority value that is the same value as a value set for one packet previous if a priority value is set for packets other than packets set with priority values using the setting information.

An information processing method of the present invention is characterized by including: a setting information acquisition controlling step of controlling acquisition of setting information for which priority values corresponding to some of packets within image data put into packet form are designated; a packet information read-out step of reading out packet information containing information relating to putting image data into the form of packets from the image data; and a priority table generation step of generating a priority table with priority values set for all packets based on setting information acquired by processing of the setting information acquisition control step and packet information read out by processing of the packet information reading step.

A program of a recording medium of the present invention is characterized by including a setting information acquisition controlling step of controlling the acquisition of setting information for which priority values corresponding to some of packets within image data put into packet form are designated; a packet information read-out step of reading out packet information containing information relating to putting image data into the form of packets from the image data; and a priority table generation step of generating a priority table with priority values set for all packets based on setting information acquired by processing of the setting information acquisition control step and packet information read out by processing of the packet information reading step.

A program of the present invention is characterized by implementing on a computer; a setting information acquisition controlling step of controlling the acquisition of setting information for which priority values corresponding to some of packets within image data put into packet form are designated; a packet information read-out step of reading out packet information containing information relating to putting image data into the form of packets from the image data; and a priority table generation step for generating a priority table with priority values set for all packets based on setting information acquired by processing of the setting information acquisition control step and packet information read out by processing of the packet information reading step.

With the information processing apparatus and method, recording medium, and program of the present invention, setting information with priority values designated corresponding to some of the packets within image data put into packet form is acquired, packet information containing information relating to putting image data into packet form is read out from the image data, and a priority table set with priority values for all of the packets is made based on this setting information and packet information.

A network refers to a construction whereby at least two apparatuses are connected to each other so that a certain apparatus is capable of transmitting information to another apparatus. Apparatuses communicating via the network may be independent apparatuses or may be internal blocks that make up a single apparatus.

BRIEF DESCRIPTION OF DRAWINGS

FIG. 3 is a view showing an example of a priority table of the related art.

FIG. 4 is a view showing a further example of a priority table of the related art.

FIG. 5 is a view showing a still further example of a priority table of the related art.

FIG. 16 is a view showing an example of a table containing setting information.

FIG. 17 is a view showing an example priority value.

FIG. 18 is a view showing an example of a priority table made by a table generation apparatus of FIG. 6.

FIG. 19 is a view showing a further example of a priority table made by a table generation apparatus of FIG. 6.

FIG. 20 is a view showing a still further example of a priority table made by a table generation apparatus of FIG. 6.

BEST MODE FOR CARRYING OUT THE INVENTION

Figure 1:
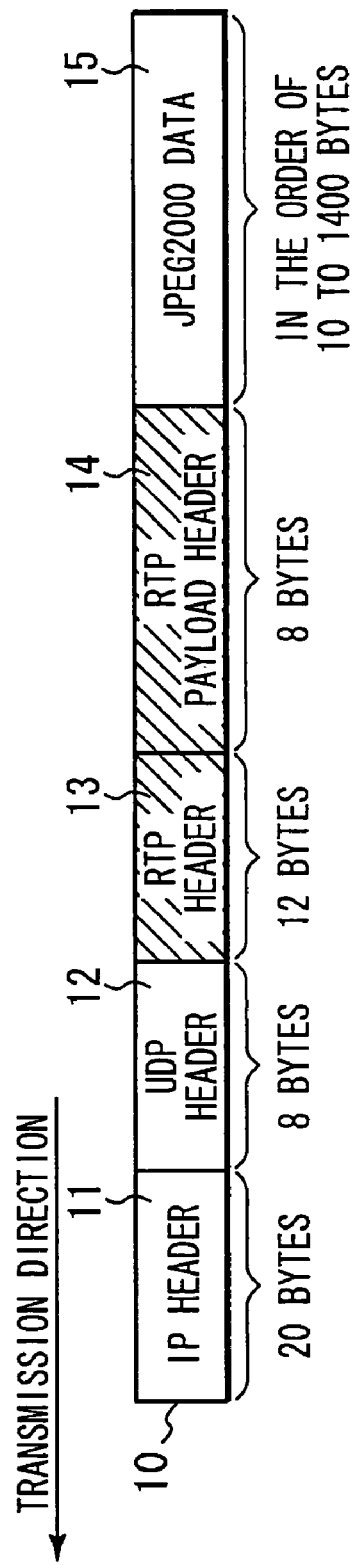
FIG. 1 is a view showing an example RTP packet format.
Figure 2:
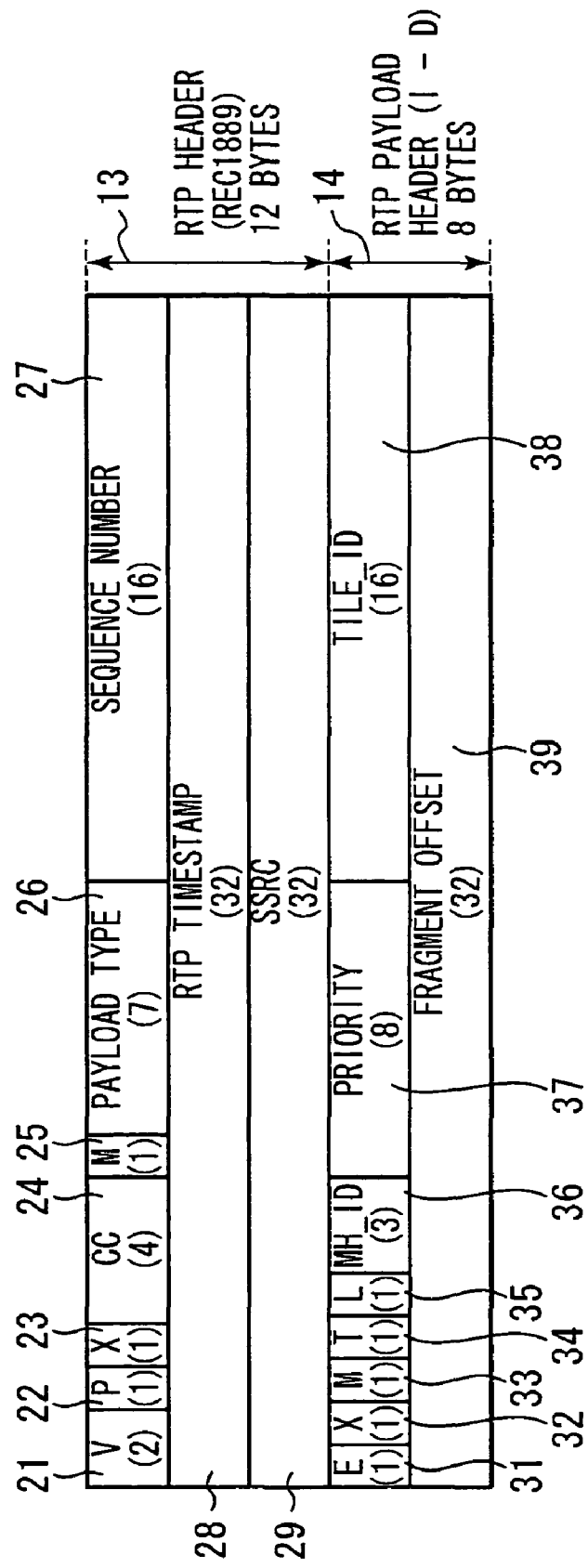
FIG. 2 is a view showing an example of a detailed configuration for a RTP header and a RTP payload header shown in FIG. 1.
Figure 6:
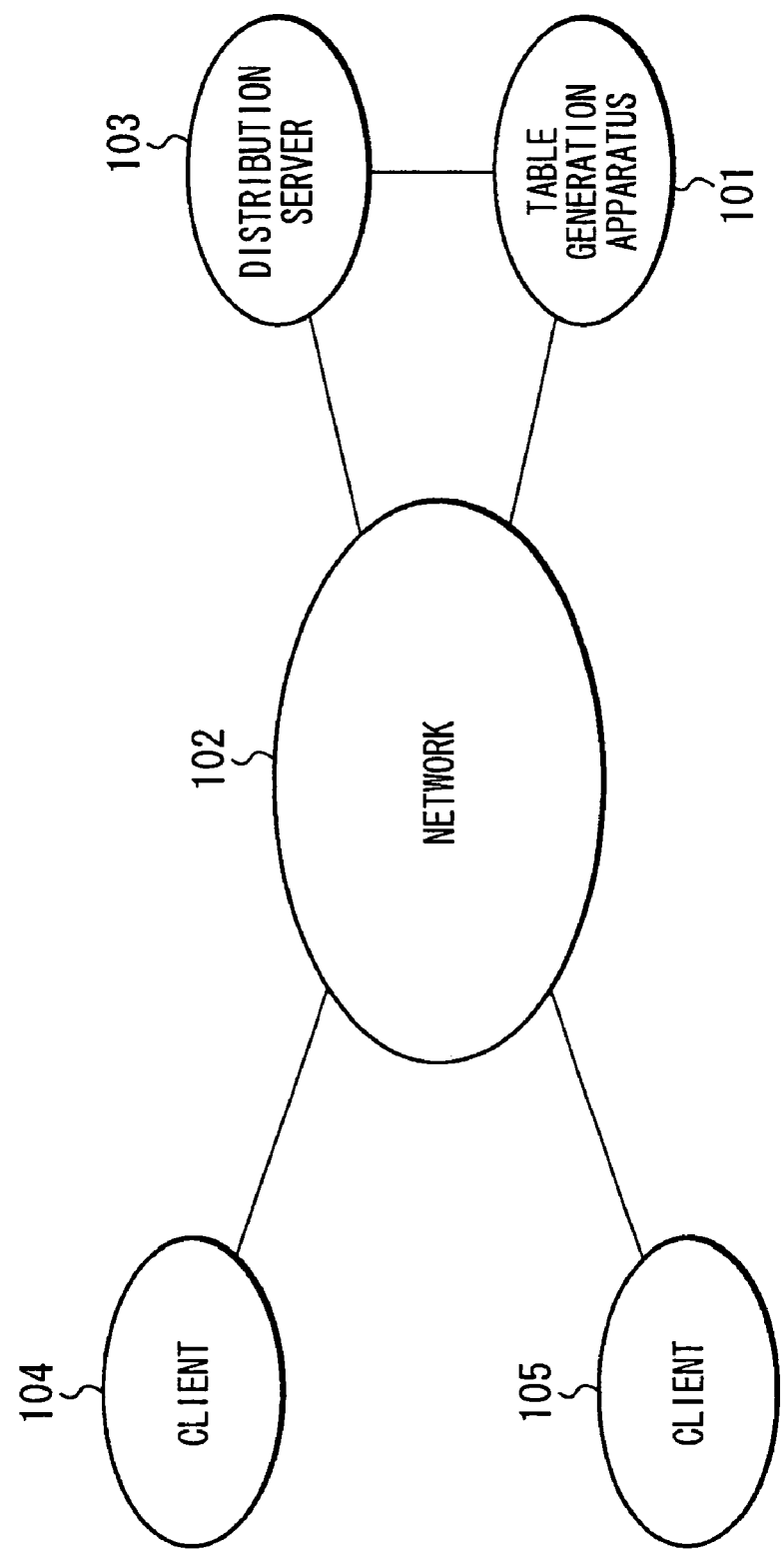
FIG. 6 is a view showing an example configuration for an image information distribution system to which the present invention is applied.

FIG. 6 is a view showing an example configuration for an image information distribution system to which the present invention is applied.

In FIG. 6, a table generation apparatus 101 for generating a priority table is connected to a network 102. Further, a distribution server 103 for carrying out streaming distribution is connected to a network and the table generation apparatus 101, puts moving image data into the form of packets based on a table provided by the table generation apparatus 101, and distributes moving image data via the network 102. Moreover, clients 104 and 105 are connected to the network 102 and acquire content data distributed by the distribution server 103 via the network 102.

The table distribution apparatus 101 generates a priority table corresponding to moving image data which is subjected to streaming distribution by the distribution server 103 based on inputted setting information and predetermined setting information.

In the event of requests from clients 104 and 105, the distribution server 103 acquires a priority table corresponding to the requested moving image data from the table generation apparatus 101, splits the moving image data up into RTP packets while allotting priority based on the acquired priority table, and distributes to requesting parties, the clients 104 and 105, via the network 102.

At the same time as acquiring RTP packets provided by the distribution server 101 via the network 102, the clients 104 and 105 generate moving image data using the acquired RTP packets and display corresponding moving images at a display etc.

Only two clients are shown in this example but an arbitrary number of clients can be connected to the network 102. Further, it is also possible to connect a plurality of table generation apparatuses 101 and distribution servers 103 to the network 102.

Figure 7:
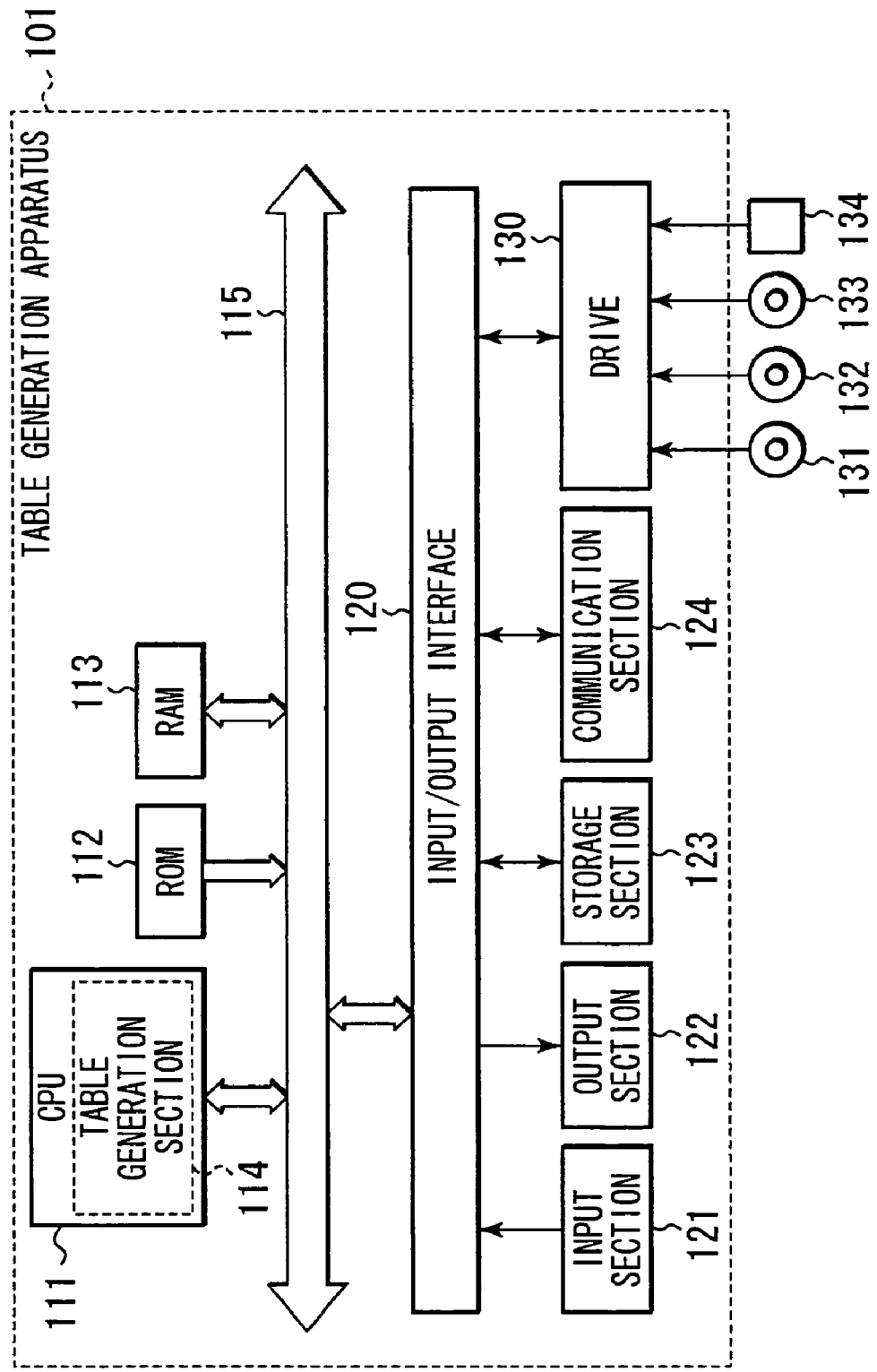
FIG. 7 is a view showing an example configuration for a table generation apparatus of FIG. 6.

FIG. 7 is a view showing an example configuration for the table generation apparatus 101.

In FIG. 7, a CPU (Central Processing Unit) 111 executes various processing in accordance with programs stored in a ROM (Read Only Memory) 112 and programs loaded into a RAM (Random Access Memory) 113 from a storage section 123. Data etc. required for the CPU 111 to execute various processes is also appropriately stored in RAM 113.

A table generation section 114 configured from a program executed by the CPU 111 (this may also be configured from hardware) takes setting information inputted as a result of a user operating an input section 121 as input via a communication section 124 etc., and generates a priority table corresponding to moving image data distributed by the distribution server 103 using setting information etc. stored in advance in the storage section 123.

The CPU 111, ROM 112 and RAM 113 are connected together via the bus 115. An input/output interface 120 is also connected to this bus 110.

An input section 121 comprised of a keyboard and mouse etc., a display comprised of a CRT or LCD etc., an output section 122 comprised of a speaker etc., a storage section 123 comprised of a hard disc etc., and a communication section 124 comprised of a modem or terminal adapter etc. are connected to the input/output interface 120. The communication section carries out communication processing of analog signals and digital signals with the distribution server 103 and carries out communication processing via the network 102.

A drive 130 is connected to the input/output interface 120 as necessary, and a magnetic disc 131, optical disc 132, magneto-optical disc 133, or semiconductor memory 134 etc. are installed as appropriate. Computer programs read from these media are then installed in the storage section 123 as necessary.

Figure 8:
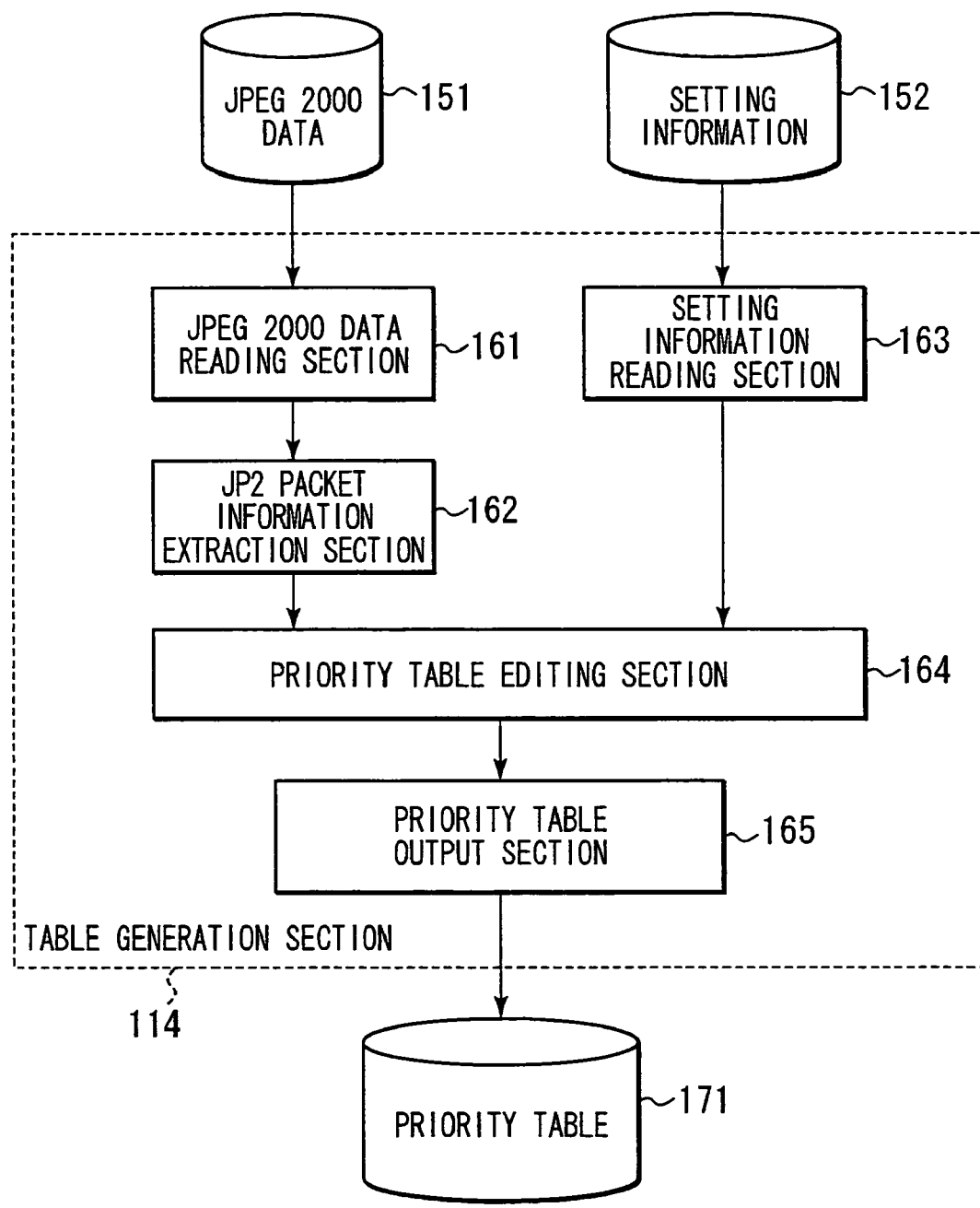
FIG. 8 is a view showing an internal configuration for a table generation section of FIG. 7.

FIG. 8 is a view showing an internal configuration for the table generation section 114.

In FIG. 8, a JPEG 2000 data reading section 161 reads in JPEG 2000 data 151 stored in the storage section 123 (or RAM 113) as input at a prescribed timing, and provides this to a JP2 packet information extraction section 162. The JP2 packet information extraction section 162 extracts JP2 packet information required to make packets from JPEG 2000 data 151 provided by the JPEG 2000 data reading section 161 and provides this to a priority table editing section 164.

A setting information reading section 163 reads in setting information 152 stored in the storage section 123 (or RAM 113) provided from outside at a prescribed timing and provides this to the priority table editing section 164.

The priority table editing section 164 edits a priority table 171 based on JP2 packet information provided by the JP2 packet information extraction section 162 and setting information 152 provided by the setting information reading section 163, edits the priority table 171, and outputs this to the priority table output section 165. The priority table output section 165 then outputs the provided priority table 171 to outside at a prescribed timing. The outputted priority table 171 is stored in a storage section 123 etc. via the bus 115.

Figure 9:
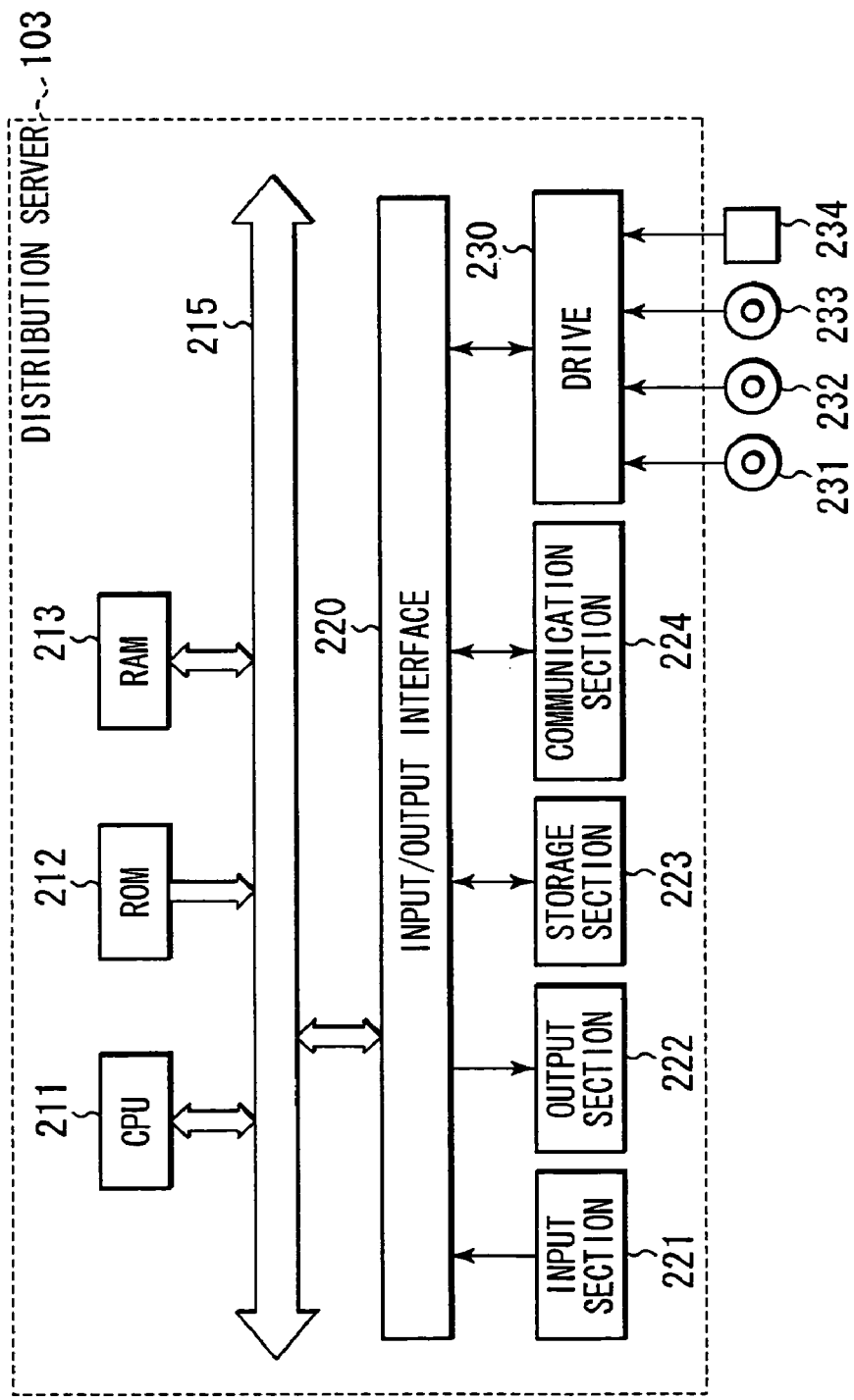
FIG. 9 is a view showing an example configuration for a distribution server of FIG. 6.

FIG. 9 is a view showing an example configuration for the distribution server 103.

In FIG. 9, a CPU (Central Processing Unit) 211 executes various processing in accordance with programs stored in a ROM (Read Only Memory) 212 and programs loaded into a RAM (Random Access Memory) 213 from a storage section 223. Data etc. required for the CPU 211 to execute various processes is also appropriately stored in RAM 213.

The CPU 211, ROM 212, and RAM 213 are connected together via a bus 215. An input/output interface 220 is also connected to this bus 215.

An input section 221 comprised of a keyboard and mouse etc., a display comprised of a CRT or LCD etc., an output section 222 comprised of a speaker etc., a storage section 223 comprised of a hard disc etc., and a communication section 224 comprised of a modem or terminal adapter etc. are connected to the input/output interface 220. The communication section 224 carries out communication processing via the network 102. The communication section 224 carries out communication processing of analog signals and digital signals with the table generation apparatus 101.

A drive 230 is connected to the input/output interface 220 as necessary, and a magnetic disc 231, optical disc 232, magneto-optical disc 233, or semiconductor memory 234 etc. are installed as appropriate. Computer programs read from these media are then installed in the storage section 233 as necessary.

Next, a description is given of a format for the JPEG 2000 data.

Figure 10:
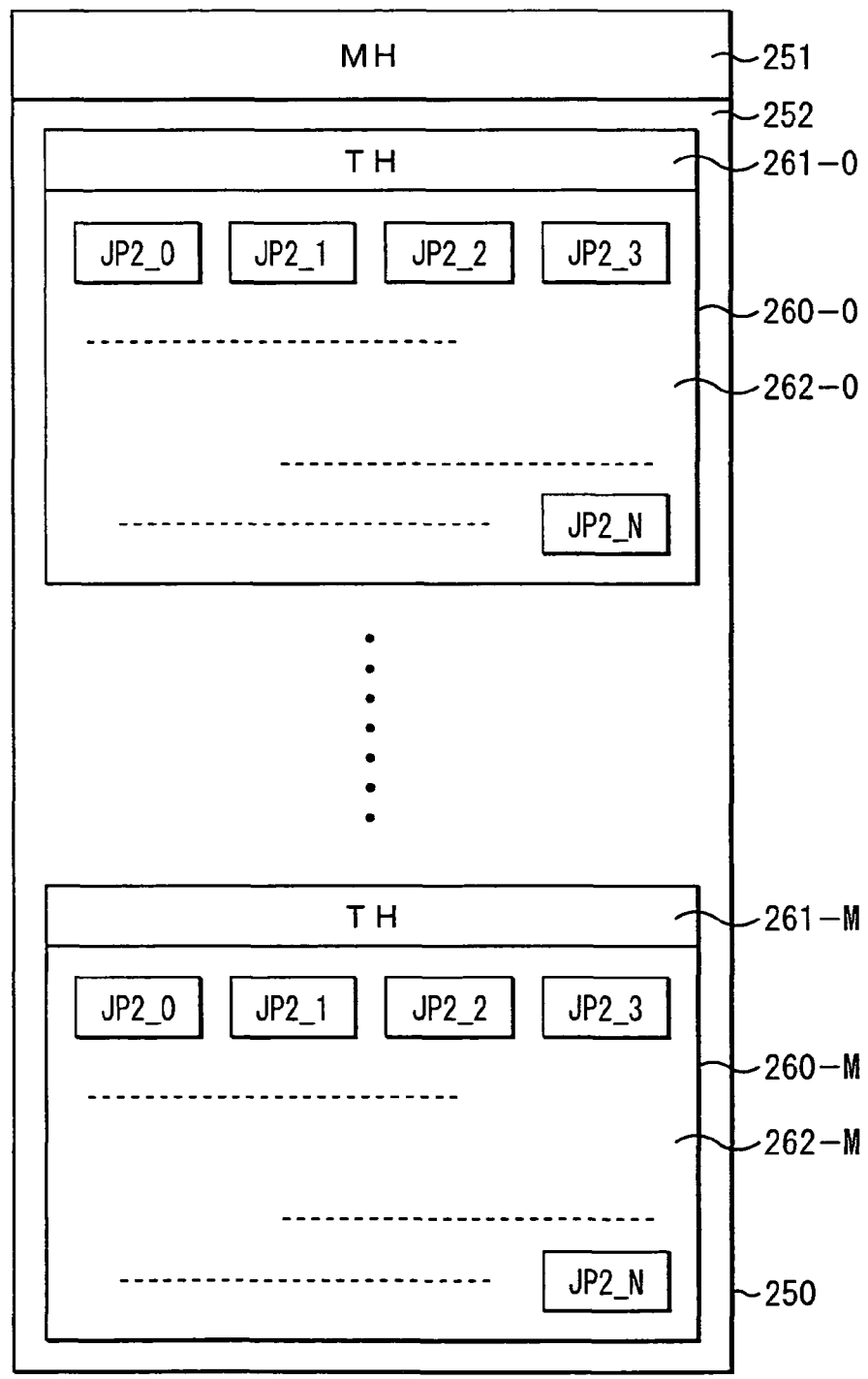
FIG. 10 is a view showing a data configuration for one frame of JPEG 2000 data.

FIG. 10 is a view showing a data configuration for one frame of JPEG 2000 data.

In FIG. 10, the data 250 constituting JPEG 2000 data for one frame is configured from a main header (MH) 251 that is a header section containing header information for one frame portion of data, and a data section 252 comprised of moving image data for one frame portion compressed using JPEG 2000.

Further, with JPEG 2000, it is possible to split an image up into several arbitrary regions that are referred to as tiles and decode only tiles for one part. Each tile size is of a fixed size designated at the time of encoding, with the tile size being described in the JPEG 2000 header. Index numbers in a direction from the upper left of the entire image to the lower right are provided at each tile. If the index number of this tile is known, there is the benefit that it is easy to determine which image portion of the whole image this tile image is for. Further, it is possible to independently encode respective portions. It is therefore possible to make savings with regards to storage regions and network bandwidth by dropping picture quality of portions the user does not particularly take notice of (for example, upper end and lower end portions of a spatial image mapped to a cylinder) and increasing compression rate.

Namely, JPEG 2000 has a function capable of decoding even when TRUNCATE images (portions of encoded data) are inputted to a decoder (client 104 or 105) and it is therefore possible to only distribute the necessary tiles.

Figure 11:
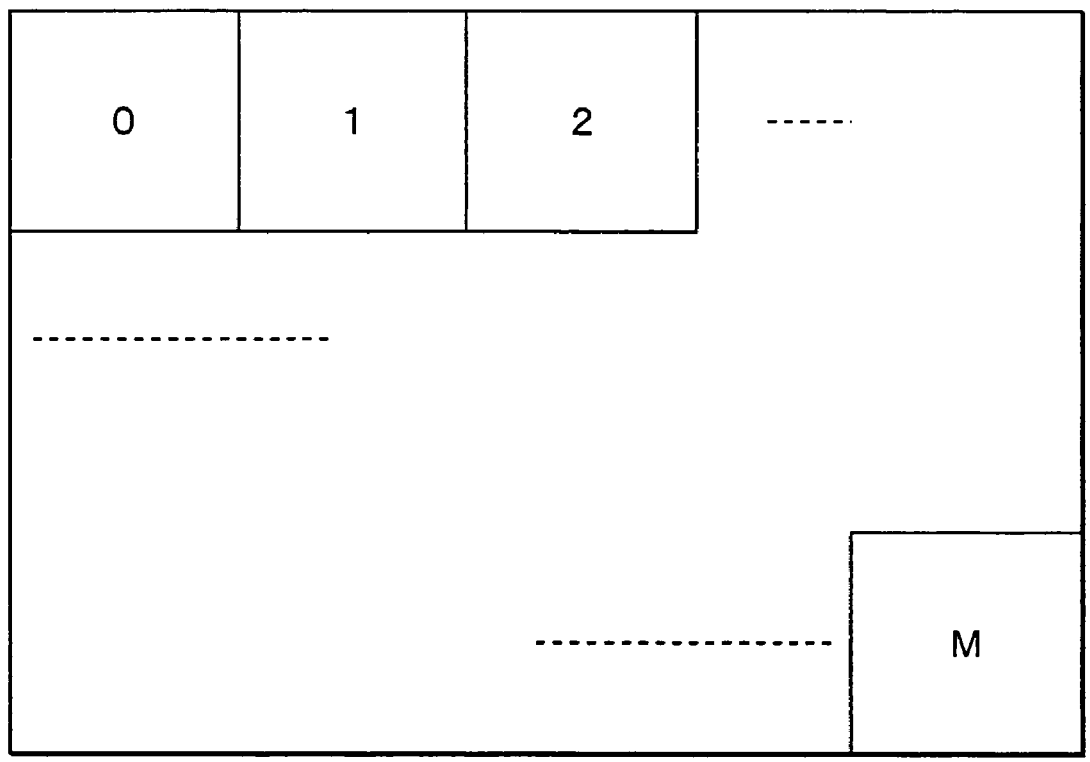
FIG. 11 is a view showing an example of dividing an image up into M tiles.

FIG. 11 shows an example of an image split up into M+1 tiles. As index numbers are allotted in order from 0 to M to the tiles, for example, an upper left coordinate for a tile image of index 3 can easily be known as (tile_width×3, 0). Here, tile_width expresses the width of the tile. Further, if tile_height expresses the height of the tile, a coordinate in a vertical direction for this tile can be known from a quotient value obtained by dividing the index number a number of times in the horizontal direction of the tile and the tile_height.

Returning to FIG. 10, moving image data for the data section 252 is configured as tile data 260-0 to 260-M every tile as described above. The tile data 260-0 is configured of a tile header (TH) 261 constituting a header section and a tile data section 262 constituting moving image data for one tile. The tile data section 262-0 is configured using data (JP2_0 to JP2_N) for every unit divided when putting into the form of RTP packets. Tile data 262-1 to 262-M is configured in the same way as the tile data 262-0 and description thereof is therefore omitted.

Next, a description is given of a method for generating a priority table corresponding to the JPEG 2000 data configured in the above manner.

Figure 12:
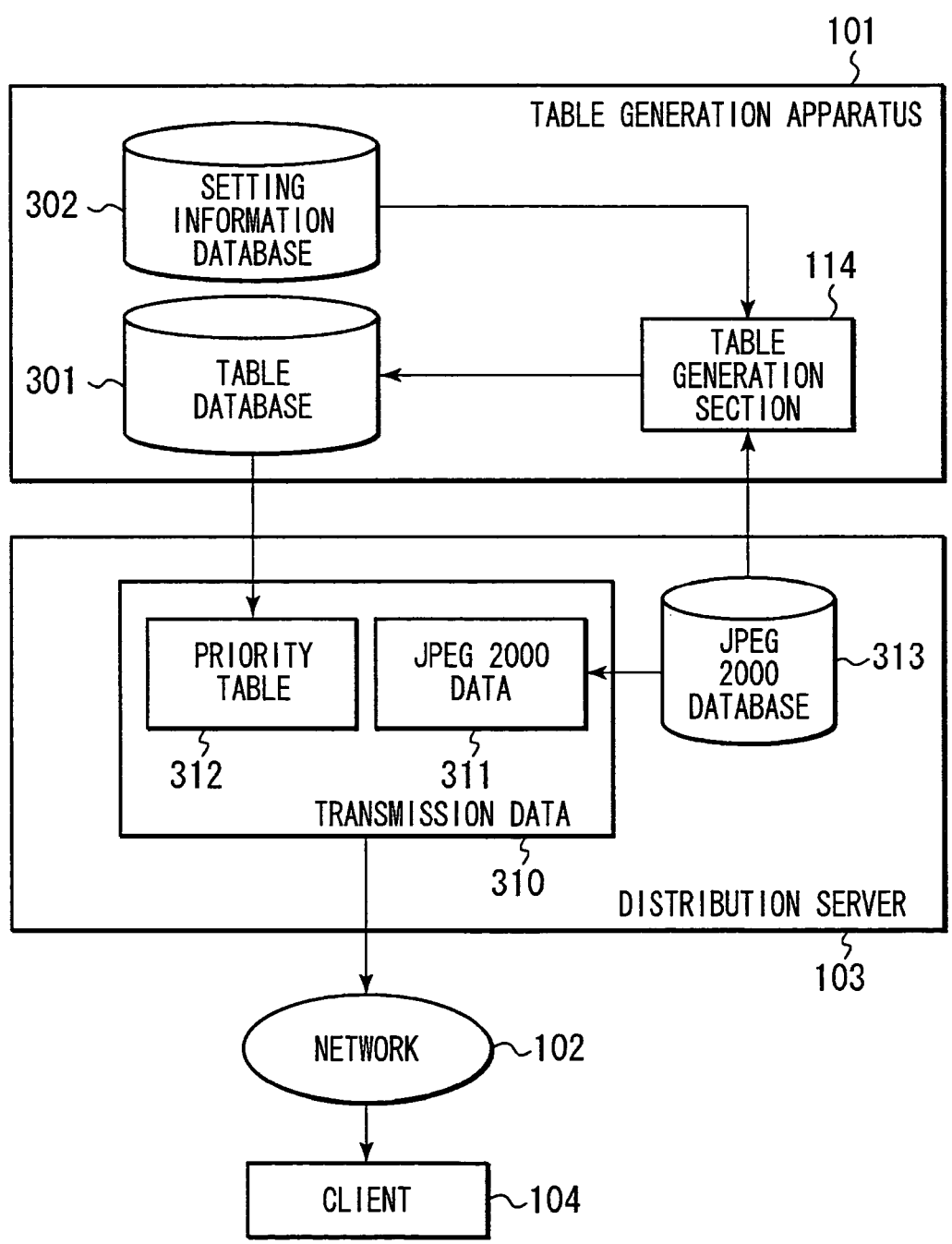
FIG. 12 is a view showing an example situation for generating a priority table.

FIG. 12 is a view showing an example situation for generating a priority table.

In FIG. 12, first, the CPU 211 of the distribution server 103 provides JPEG 2000 data 151 pre-registered in a JPEG 2000 database 313 configured in the storage section 223 to the table generation apparatus 101 via the communication section 224.

The table generation section 114 of the table generation apparatus 101 acquires JPEG 2000 data 151 provided by the distribution server 103 via the JPEG 2000 data reading section 161 (communication section 124). The setting information reading section 163 then acquires setting information 152 for generating a priority table pre-registered in a setting information database 302 made at the storage section 123. Setting information registered in the setting information database 302 may be setting information made as a result of a user operating the input section 121 or may be setting information inputted from the outside via the communication section 124. Further, setting information inputted via the drive 130 using a recording medium is also possible.

The priority table editing section 164 generates a priority table 171 corresponding to inputted JPEG 2000 data based on inputted JPEG 2000 data 151 and setting information 152. The priority table output section 165 then provides the priority table 171 made in this way to the table database 301 configured at the storage section 123 for recording.

For example, in the event that there is a request at a client for streaming distribution, the CPU 211 of the distribution server 103 acquires JPEG 2000 data 311 requested for distribution from the JPEG 2000 database 301 of the storage section 223, acquires a corresponding priority table 312 from the table database 303 of the table generation apparatus 101 via the communication section 224, and holds this in RAM 213 etc. as transmission data 310. The CPU 211 puts the transmission data 310 into the form of packets at a prescribed timing and provides these to the client 104 via the network 102.

Figure 13:
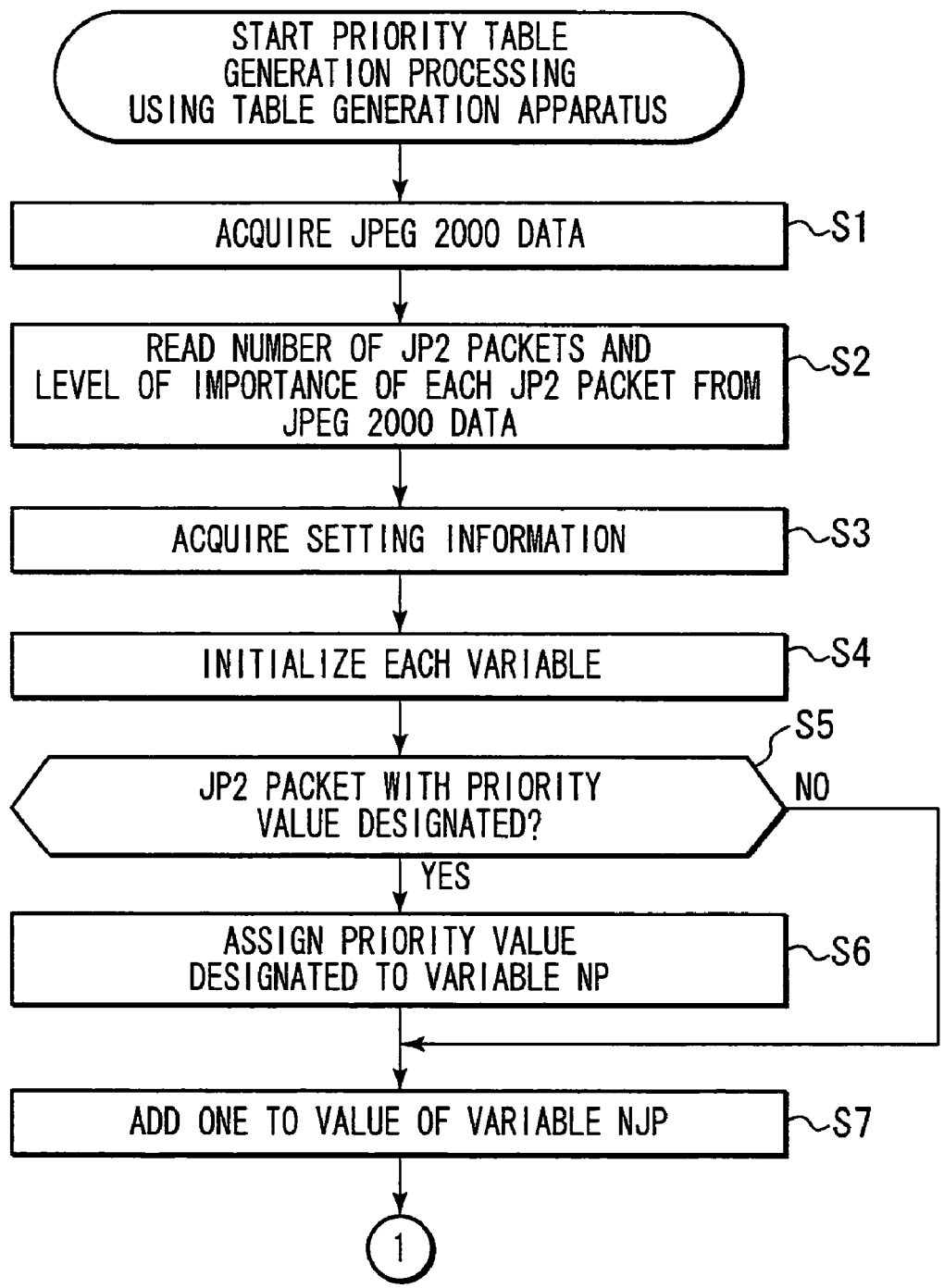
FIG. 13 is a flowchart illustrating a priority table generation process performed by a table generation apparatus of FIG. 6.
Figure 14:
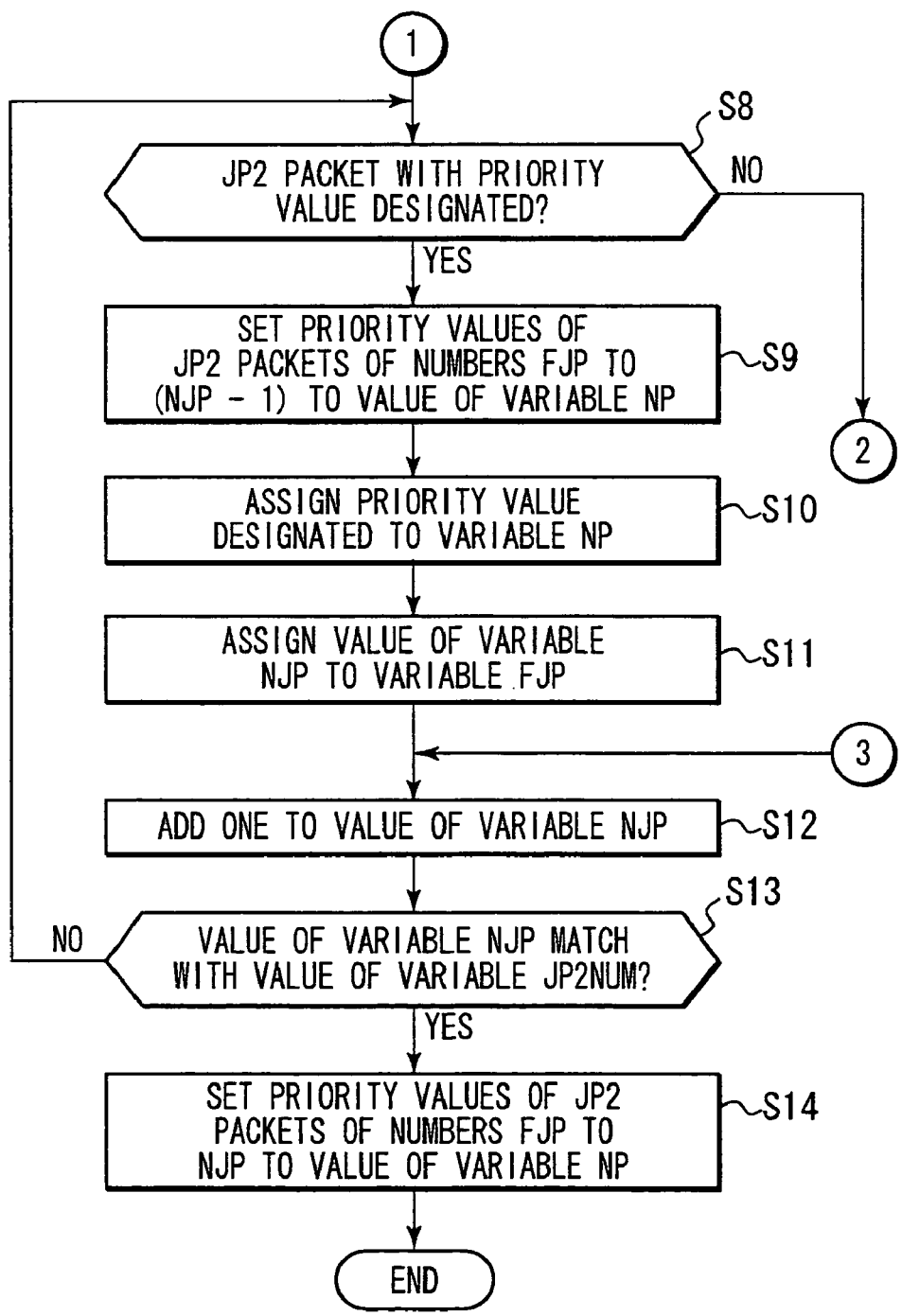
FIG. 14 is a flowchart continuing on from FIG. 13 illustrating a priority table generation process performed by a table generation apparatus of FIG. 6.
Figure 15:
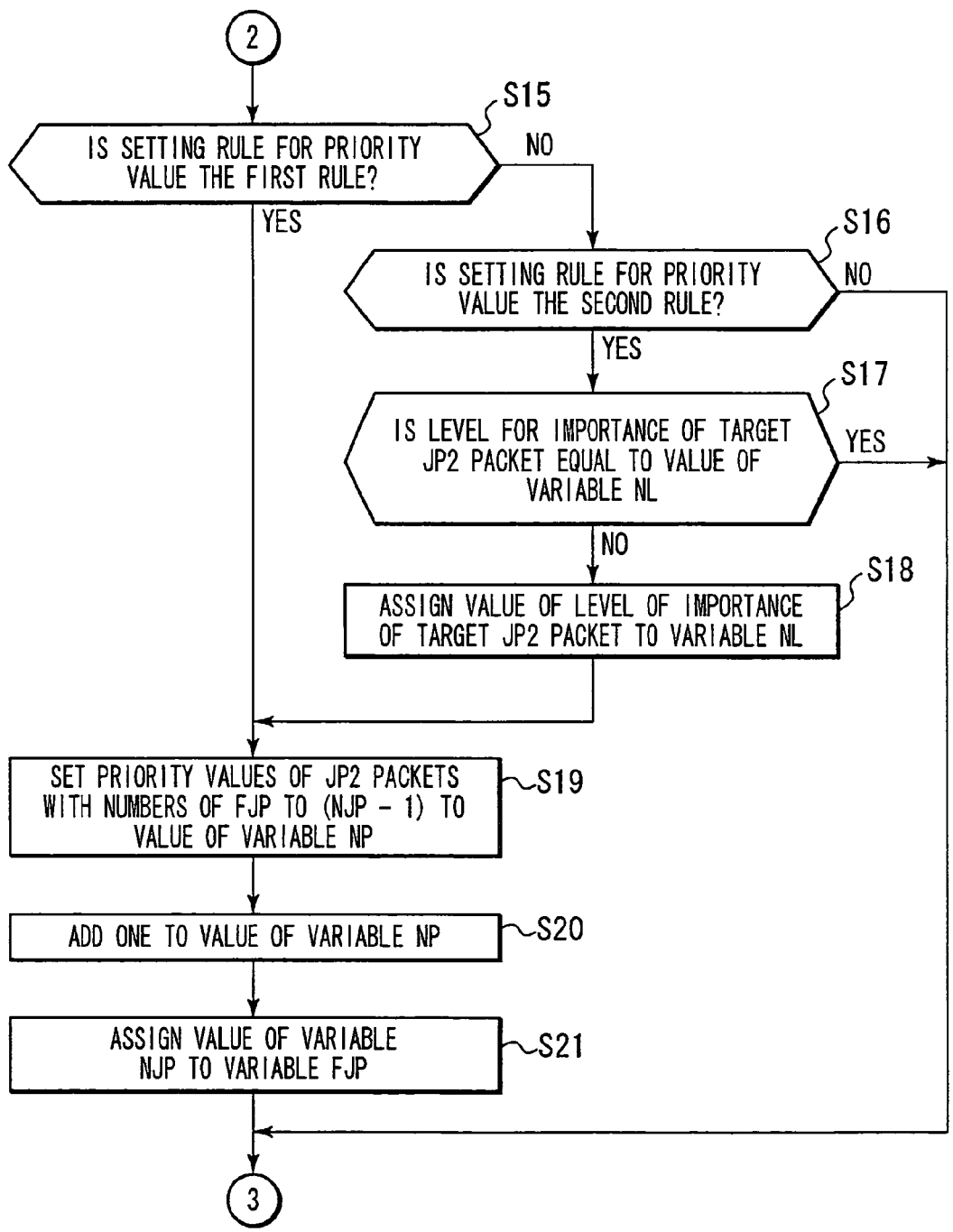
FIG. 15 is a flowchart continuing on from FIG. 14 illustrating a priority table generation process performed by a table generation apparatus of FIG. 6.

Next, a description is given of a priority table generation process performed by the table generation apparatus 101 with reference to FIG. 13 to FIG. 15.

In step S1 of FIG. 13, first, the JPEG 2000 data reading section 161 of the table generation apparatus 101 acquires and holds JPEG 2000 data 151 for generating a table via the communication section 124 using the distribution server 103.

The JPEG 2000 data reading section 161 then provides the held JPEG 2000 data 15 to the JP2 packet information extraction section 162 at a prescribed timing. In step S2, the JP2 packet information extraction section 162 reads out the number of JP2 packets made (J2PNUM) and the level of importance of each JP2 packet from the provided JPEG 2000 data 151 and provides this information to the priority table editing section 164.

As described in FIG. 10, the data 250 for each frame of the JPEG 2000 data 151 is such that data is configured every time a unit is put into packet form. The JP2 packet information extraction section 162 then reads out the number of JP2 packets made by counting these numbers and referring to information contained in the title headers (TH) 261-0 to 261-M or the main header (MH) 251.

Further, as described in the following with reference to FIG. 17, the JPEG 2000 data is such that the levels of importance are designated in advance for every unit put into packet form. The JP2 packet information extraction section 162 then reads out the levels of importance of the made JP2 packets by referring to information contained in the title headers (TH) 261-0 to 261-M or the main header (MH) 251.

In step S3, the setting information reading section 163 acquires and holds setting information corresponding to acquired JPEG 2000 data stored in advance in the storage section 123 (setting information database 302).

The kind of table shown in FIG. 16 is contained in the setting information.

In FIG. 16, the table 351 contained in the setting information is a correspondence table of conditions for layers (L) and resolution (R) and designated priority values. As shown in FIG. 16, priority values are not set for all JP2 packets but rather only conditions for arbitrary numbers designated by the user and corresponding priority values are recorded. In the example in FIG. 16, in the event that the layer is "0", if the resolution is "0", the priority value is taken to be "10", and if the resolution is "one or more", the priority value is taken to be "20". Further, if the resolution is "0 or more" with a layer of "1", the priority value is taken to be "30".

The setting information reading section 163 holds setting information contained in the table 351 shown in FIG. 16 and provides this to the priority table editor 164 at a prescribed timing.

In step S4, the priority table editor 164 initials each of the variables to be used in editing the priority table. NJP indicating numbers of JP2 packets taken as targets, NP indicating the current priority value, NL indicating the level of importance of the current JP2 packet, and FJP indicating the starting number of JP2 packets having the same priority numbers are prepared as variables for use in editing the priority table. The priority table editor 164 performs initialization by setting the value of NJP to "1", setting the value of NP to "1", setting the value of NL to the level of importance of the first JP2 packet, and setting the value of FJP to "0".

Further, at this time, the priority table editing section 164 decides upon the method (rule) for setting the priority value. As described in the following with reference to FIG. 17, for example, three rules consisting of a rule to increment the priority value every JP2 packet, a rule to increment every time the level of importance of a JP2 packet changes, and a rule not to increment are prepared as rules for setting the priority value. The priority table editing section 164 then selectively decides the setting rules based on inputted setting information or based on a designation inputted as a result of a user operating the input section 121.

The rules for setting the priority values prepared here may be rules other than those described above and there may be any number of rules.

In step S5, the priority table editing section 164 completing the processing in step S4 extracts data for one packet taken as a target from the acquired JPEG 2000 data, and a determination is made as to whether or not the JP2 packet that is the extracted data put into packet form is a JP2 packet of a priority value designated by the setting information.

In the event that it is determined that the JP2 packet that is the extracted data put into packet form is a JP2 packet of a designated priority value, the priority table editing section 164 advances the processing to step S6, assigns the designated priority value based on the setting information to the variable NP, and advances processing to step S7.

In step S4, in the event that it is determined that the JP2 packet that is the extracted data put into packet form is not a JP2 packet of a designated priority value, the priority table editing section 164 omits the processing of step S6 and advances processing to step S7.

In step S7, the priority table editing section 164 adds one to the value of the variable NJP and the processing of step S8 of FIG. 14 is advanced to.

In step S8 of FIG. 14, the priority table editing section 164 extracts data (data for the next packet) for one packet constituting a target from the acquired JPEG 2000 data and determines whether or not the JP2 packet that is the extracted data put into packet form is the JP2 packet for which the priority value is designated by the setting information. In the event that a JP2 packet that is the extracted data put into packet form is determined to be a JP2 packet for which the priority value is designated, the priority table editing section 164 advances processing to step S9 and sets the value of the variable NP to all of the priority values of each JP2 packet for which the packet number is FJP to (NJP−1).

In step S10, the priority table editing section 164 assigns the priority value designated based on the setting information to the variable NP. In step S11, the value of the variable NJP is assigned to the variable FJP. In step S12, one is added to the value of the variable NJP.

The priority table editing section 164, having completed the processing of step S12, in step S13, compares the value of the variable NJP and the value of the variable JP2NUM set in step S2, and determines whether or not both match.

In the event that it is determined that the value of the variable NJP is smaller than the variable JP2NUM (that there is no matching), the priority table editing section 164 returns processing to step S8 and repeats the processing for thereafter. Namely, in the event that the JP2 packet for which the priority value is designated is processed, the priority table editing section 164 sets JP2 packets reserved in the processing up to now and sets priory values regardless of priority value setting rules set in step S4. Priority values for all of the JP2 packets are then set by repeating the processing of step S8 to step S13 including the processing of step S15 to step S21 of FIG. 15 described later.

In step S13, in the event that the value of the variable NJP and the value of the variable JP2NUM coincide, the priority table editing section 164 advances processing to step S14, the priority values of each of the JP2 packets of numbers FJP to NJP are all set to the value of the variable NP, and the priority table generation process ends.

Further, in step S8 of FIG. 14, in the event that it is determined that the JP2 packet that is the extracted data put into packet form is not a JP2 packet designated by the priority value, the priority table editing section 164 advances processing to step S15 of FIG. 15.

In step S15 of FIG. 15, the priority table editing section 164 determines whether or not the rule for setting priority values set in step S4 is the first rule for incrementing the set priority value every JP2 packet.

In the event that the setting rule is determined to be the first rule, the priority table editing section 164 advances processing to step S19, and the value of the variable NP is set as the priority value of JP2 packets of numbers FJP to (NJP−1). In step S20, the priority table editing section 164 adds one to the value of the variable NP. In step S21, after assigning the value of the variable NJP to the variable FJP, step S12 of FIG. 14 is returned to, and the processing thereafter is repeated.

Namely, in the event that the rule for setting the priority value is the first rule, the priority table editing section 164 sets the priority value regardless of what kind of packet the JP2 packet that is the extracted data put into packet form is, and adds "1" to the value of the variable NP set as the priority value so as to increment this value.

Further, in step S15 of FIG. 15, in the event that it is determined that the rule for setting the priority value is not the first rule, the priority table editing section 164 advances processing to step S16, and a determination is made as to whether or not the rule for setting the priority value set in step S4 is the second rule for incrementing the set priority value every time the level of importance of a JP2 packet changes.

In the event that the second rule is determined to be present, the priority table editing section 164 advances processing to step S17, and a determination is made as to whether the level of importance of the target JP2 packet is equal to the value of the variable NL.

In the event that the level of importance of the JP2 packet changes so as to become a different value to the level of importance of the previous JP2 packet so that the level of importance of the target JP2 packet is determined not to be equal to the value of the variable NL, the priority table editing section 164 advances processing to step S18, and after assigning the value of the level of importance of the target JP2 packet to the variable NL, the processing is advanced to step S19, and the processing from thereafter is repeated.

Further, in step S17, in the event that the level of importance of the JP2 packet does not change so as to be the same value as the level of importance of the previous JP2 packet, so that the level of importance of the JP2 packet constituting a target is determined to be equal to the value of the variable NL, the priority table editing section 164 returns to step S12 of FIG. 14, and the processing from thereafter is repeated.

Namely, in the event that the rule for setting the priority value is the second rule, the level of importance of the JP2 packet that is the extracted data put into packet form changes, or the priority value is set and the level of importance of the JP2 packet does not change, the processing of this packet is deferred, and the processing of the next JP2 packet is proceeded to.

Further, in step S16, in the event that it is determined that the rule for setting the priority value set in step S4 is the third rule where the set priority value is not incremented and not the second rule, the priority table editing section 164 returns the processing to step S12 of FIG. 14, and the processing thereafter is repeated.

Namely, in the event that the rule for setting the priority value is the third rule, the priority table editing section 164 defers processing with respect to all JP2 packets other than JP2 packets for which priority values have been designated and advances processing to the next JP2 packet.

As a result of the above, the table generation apparatus 101 executes priority table generation processing. As a result, the table generation apparatus 101 is able to make a priority table with priority values set for all of the JP2 packets even if priority values have not been set for all of the JP2 packets.

FIG. 17 is a view showing an example of a priority value made by the priority table generation process described above.

In FIG. 17, the JPEG 2000 data is configured from two tiles, with a single tile being divided into six JP2 packets (JP2_0 to JP2_5). As shown in FIG. 17, the level of importance of each JP2 packet is set to three levels of high, medium, and low.

The results of setting priority values to this kind of JPEG 2000 data are shown as pattern 1-1 to 1-5, 2-1 to 2-3, and 3-1 to 3-3. The values surrounded by squares show priority values set in advance by a user in a table contained in the setting information.

The patterns 1-1 and 1-2 show an example of priority values in the event where the value "10" is set as the priority value for the first JP2 packet (JP2_0) for each tile, the value "20" is set as the priority value for the second JP2 packet (JP2_1), and the value "30" is set as the priority value of the fifth JP2 packet (JP2_4).

The third rule is used for the pattern 1-1. The priority value is not incremented for JP2 packets other than the JP2 packets for which priority values are designated. The same value as for the priority value of a JP2 packet designated immediately before is set at each JP2 packet.

The first rule is employed for the pattern 1-2. The priority value is incremented every JP2 packet with the limitation that the priority value designated next is not exceeded even for JP2 packets other than JP2 packets for which priority values have been designated. A value different to the priority value of the JP2 packet immediately before is therefore set at each JP2 packet.

The patterns 1-3 to 1-5 show an example of priority values in the event where the value "10" is set as the priority value for the first JP2 packet (JP2_0) for each tile and the value "20" is set as the priority value for the second JP2 packet (JP2_1).

The third rule is used for the pattern 1-3. The priority value is not incremented for JP2 packets other than the JP2 packets for which priority values are designated. The same value as for the priority value of a JP2 packet designated immediately before is set at each JP2 packet.

The first rule is employed for the pattern 1-4. The priority value is incremented every JP2 packet with the limitation that the priority value designated next is not exceeded even for JP2 packets other than JP2 packets for which priority values have been designated. A value different to the priority value of the JP2 packet immediately before is therefore set at each JP2 packet.

The second rule is employed for the pattern 1-5. The priority value is incremented every time the level of importance of a JP2 packet changes, with the limitation that the priority value designated next is not exceeded for JP2 packets other than JP2 packets for which priority values have been designated. A value different to the priority value of the JP2 packet immediately before is therefore set at this JP2 packet in the event that the level of importance of a JP2 packet changes.

The patterns 2-1 to 2-3 show examples of priority values in the event of setting the value "10" as the priority value of the first JP2 packet (JP2_0) of each tile.

The third rule is used for the pattern 2-1. The priority value is not incremented for JP2 packets other than the JP2 packets for which priority values are designated. The same value as for the priority value of a JP2 packet designated immediately before is set at each JP2 packet.

The first rule is employed for the pattern 2-2. The priority value is incremented every JP2 packet with the limitation that the priority value designated next is not exceeded even for JP2 packets other than JP2 packets for which priority values have been designated. A value different to the priority value of the JP2 packet immediately before is therefore set at each JP2 packet.

The second rule is employed for the pattern 2-3. The priority value is incremented every time the level of importance of a JP2 packet changes, with the limitation that the priority value designated next is not exceeded for JP2 packets other than JP2 packets for which priority values have been designated. A value different to the priority value of the JP2 packet immediately before is therefore set at this JP2 packet in the event that the level of importance of a JP2 packet changes.

The patterns 3-1 to 3-3 show examples of priority values in the event that property values are not set at all.

The third rule is used for the pattern 3-1. The priority value is not incremented for JP2 packets other than the JP2 packets for which priority values are designated. The same value as for the priority value of a JP2 packet designated immediately before is set at each JP2 packet.

The first rule is employed for the pattern 3-2. The priority value is incremented every JP2 packet with the limitation that the priority value designated next is not exceeded even for JP2 packets other than JP2 packets for which priority values have been designated. A value different to the priority value of the JP2 packet immediately before is therefore set at each JP2 packet.

The second rule is employed for the pattern 3-3. The priority value is incremented every time the level of importance of a JP2 packet changes, with the limitation that the priority value designated next is not exceeded for JP2 packets other than JP2 packets for which priority values have been designated. A value different to the priority value of the JP2 packet immediately before is therefore set at this JP2 packet in the event that the level of importance of a JP2 packet changes.

In the above, the set priority value is stored in the table database 303 made at the storage section 123 as a priority table as shown in FIG. 18 to FIG. 20 and is referenced by the distribution server 103 when putting the JPEG 2000 data into the form of packets.

FIG. 18 is a view showing an example of a priority table made by the table generation apparatus 101.

In FIG. 18, the priority table 361 is a table configured using priority values set using the third rule described above. Priority values are set for all of the JP2 packets in the priority table 361.

In the example in FIG. 18, in the event that the layer is "0", if the resolution is "0", the priority value is taken to be "10". When the resolution is "1", the priority value is taken to be "20". When the resolution is "2", the priority value is taken to be "20", without incrementing taking place. Further, if the resolution is "0" with a layer of "1", the priority value is taken to be "20" and incrementing does not take place. When the resolution is "1", the priority value is taken to be "30". When the resolution is "2", the priority value is taken to be "30", without incrementing taking place.

FIG. 19 is a view showing a further example of a priority table made by the table generation apparatus 101.

In FIG. 19, the priority table 362 is a table configured using priority values set using the first rule described above. Priority values are set for all of the JP2 packets in the priority table 362.

In the example in FIG. 19, in the event that the layer is "0", if the resolution is "0", the priority value is taken to be "10". When the resolution is "1", the priority value is taken to be "20". When the resolution is "2", the priority value is incremented and is taken to be "21". Further, if the resolution is "0" with a layer of "1", the priority value is taken to be "22" and incrementing does not take place. When the resolution is "1", the priority value is taken to be "30". When the resolution is "2", the priority value is incremented so as to be taken to be "31".

FIG. 20 is a view showing a still further example of a priority table made by the table generation apparatus 101.

In FIG. 20, the priority table 363 is a table configured using priority values set using the second rule described above. Priority values are set for all of the JP2 packets in the priority table 363.

In the example in FIG. 20, in the event that the layer is "0", if the resolution is "0", the priority value is taken to be "10". When the resolution is "1", the priority value is taken to be "20". When the resolution is "2", the priority value is taken to be "20", without incrementing taking place. Further, if the resolution is "0" with a layer of "1", the priority value is incremented so as to become "21" and incrementing does not take place. When the resolution is "1", the priority value is taken to be "30". When the resolution is "2", the priority value is taken to be "30", without incrementing taking place.

In the above, the table generation apparatus 101 sets priority values for all of the JP2 packets using priority values designated only for some JP2 packets by a user. It is therefore straightforward for any kind of priority table to be made by the user.

In the above, "system" refers to the overall apparatus configured from a plurality of apparatuses.

Further, the table generation apparatus 101 and distribution server 103 of FIG. 6 are described as being constructed separately but this is by no means limiting and the table generation apparatus 101 and distribution server 103 may also make up a single apparatus.

The series of processes described above are executed using hardware, but may also be executed using software. When the series of processes is implemented using software, the programs comprising this software may be built-into dedicated hardware of a computer. Further, as it is possible to implement various functions by installing the various programs, installation is also possible from a network or recording medium to, for example, a general-purpose personal computer.

As shown in FIGS. 7 and 9, in addition to this recording medium for distribution providing programs to the users that is separate from the apparatus body being comprised of magnetic discs 131 and 231 (including flexible discs) recorded with the programs, optical discs 132 and 232 (including CD-ROMs (Compact Disk-Read Only Memory) and DVDs (Digital Versatile Discs)), magneto-optical discs 133 and 233 (including MDs (Mini-Discs) (trademark)), or packaged media such as semiconductor memory 134 and 234 etc., the programs may also be provided to the users in a manner built-into the apparatus body, such as in the case of ROM 112 and 212 recorded with the programs or with hard discs containing storage sections 123 and 223 etc.

In this specification, the steps described by programs recorded in recording media are for processing carried out in chronological order in the order disclosed but this processing by no means has to be carried out in chronological order, and these processes may also be executed in parallel or individually.

INDUSTRIAL APPLICABILITY

In the above, according to the present invention, it is possible to make a priority table. In particular, this can be made in a straightforward manner.

The invention claimed is:

1. An information processing apparatus for generating a priority table that serves as a mapping table between packets of an image data and a priority value representing a priority of individual packets, the information processing apparatus comprising:
a setting information acquisition module for acquiring setting information for which priority values corresponding to some of the packets of the image data are designated;
a packet information read-out module for reading out packet information containing information for putting the image data into the form of packets from the image data; and
a priority table generation module for generating a priority table with priority values set for all packets of the image data based on the setting information acquired by the setting information acquisition module and the packet information read out by the packet information read-out module,
wherein the priority table generation module comprises a priority table editing section configured to edit the priority values in the priority table based on packet information and the setting information, the priority table editing section configured to select a rule for setting the priority value based on the setting information, wherein the rule is selected from among a plurality of predefined rules and each rule of the plurality of rules is configured to control a manner in which the priority values in the priority table are set.

2. The information processing apparatus according to claim 1, wherein the packet information contains the numbers of packets and the levels of importance corresponding to each of the packets.

3. The information processing apparatus according to claim 1, wherein the priority table generation module sets a priority value larger than a value set for one previous packet when a priority value is set for packets other than packets set with priority values using the setting information.

4. The information processing apparatus according to claim 2, wherein when the priority values are set for packets other than packets set with priority values using the setting information, the priority table generation module sets a priority value larger than the value set for one packet previous when the packet's level of importance is different to the packet's level of importance for one packet previous, and a priority value that is the same value as the value set for one packet previous is set when the packet's level of importance is the same as the packet's level of importance for one packet previous.

5. The information processing apparatus according to claim 1, wherein the priority table generation module sets a priority value that is the same value as a value set for one packet previous when a priority value is set for packets other than packets set with priority values using the setting information.

6. The information processing apparatus according to claim 1, wherein the plurality of rules includes:
a first rule that causes the priority table editing section to increment the priority value of every packet;
a second rule that causes the priority table editing section to increment the priority value of a respective packet every time the level of importance of the respective packet changes; and
a third rule that causes the priority table editing section to defer processing of all packets other than the packets for which priority values have been designated.

7. An information processing method for generating a priority table that serves as a mapping table of packets of an image data and a priority value representing a priority of individual packets, the information processing method comprising:
receiving setting information for which priority values corresponding to some of the packets of the image data are designated;

reading out packet information containing information for putting the image data into the form of packets from the image data;

generating a priority table with priority values set for all packets of the image data based on the setting information acquired by processing the setting information acquisition control step and the read-out packet information; and selecting a rule for setting the priority value based on the setting information, wherein the rule is selected from among a plurality of predefined rules and each rule of the plurality of rules is configured to control a manner in which the priority values in the priority table are set; and editing the priority values in the priority table based the determined rule for setting the priority value.

8. A computer-readable memory storing a computer readable program for performing, when executed by a processor, a method of generating a priority table that serves as a mapping table between packets of an image data and a priority value representing a priority of individual packets, the method comprising:

receiving setting information for which priority values corresponding to some of the packets of the image data are designated;

reading out packet information containing information for putting the image data into the form of packets from the image data based on the received setting information and the read-out packet information;

generating a priority table with priority values set for all packets of the image data based on the received setting information and the read-out packet information;

selecting a rule for setting the priority value based on the setting information, wherein the rule is selected from among a plurality of predefined rules and each rule of the plurality of rules is configured to control a manner in which the priority values in the priority table are set; and editing the priority values in the priority table based the determined rule for setting the priority value.

\* \* \* \* \*